United States Patent
Abe et al.

(10) Patent No.: US 8,432,346 B2
(45) Date of Patent: Apr. 30, 2013

(54) LIQUID CRYSTAL DISPLAY PROJECTOR AND METHOD OF CONTROLLING THE SAME

(75) Inventors: Masayuki Abe, Utsunomiya (JP); Jun Koide, Tokyo (JP); Yuya Kurata, Utsunomiya (JP); Teppei Kurosawa, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 906 days.

(21) Appl. No.: 11/615,402

(22) Filed: Dec. 22, 2006

(65) Prior Publication Data

US 2007/0164965 A1    Jul. 19, 2007

(30) Foreign Application Priority Data

Jan. 6, 2006  (JP) ................... 2006-001891
Dec. 21, 2006 (JP) ................... 2006-344835

(51) Int. Cl.
*G09G 3/36* (2006.01)

(52) U.S. Cl.
USPC ........................................................ 345/98

(58) Field of Classification Search ............. 345/87–104
See application file for complete search history.

(56) References Cited

U.S. PATENT DOCUMENTS

| | | | |
|---|---|---|---|
| 6,628,258 B1* | 9/2003 | Nakamura | 345/98 |
| 7,038,748 B2 | 5/2006 | Sasaki | |
| 7,436,470 B2* | 10/2008 | Doe | 349/77 |
| 2004/0056834 A1* | 3/2004 | Saitou et al. | 345/94 |
| 2005/0231458 A1* | 10/2005 | Miki | 345/102 |
| 2006/0109233 A1* | 5/2006 | Lee et al. | 345/102 |

FOREIGN PATENT DOCUMENTS

| | | |
|---|---|---|
| JP | H06-250148 | 9/1994 |
| JP | 2001-296554 A | 10/2001 |
| JP | 2002-365655 | 12/2002 |
| JP | 2003-158747 A | 5/2003 |
| JP | 2005-049817 | 2/2005 |
| JP | 2005-164704 A | 6/2005 |
| JP | 2006-284981 A | 10/2006 |

* cited by examiner

*Primary Examiner* — Alexander Eisen
*Assistant Examiner* — Robin Mishler
(74) *Attorney, Agent, or Firm* — Rossi, Kimms & McDowell LLP

(57) ABSTRACT

A liquid crystal display apparatus is disclosed which can prevent occurrence of flicker regardless of display modes. The apparatus includes a liquid crystal modulation element which includes a liquid crystal layer between a first electrode and a second electrode, a controller which controls a potential difference to be applied between the first and second electrodes. The apparatus operates in first and second modes, which are different in the light amount entering the element. A memory stores first information for the first mode and second information for the second mode as controlling information on a potential difference between the electrodes for suppressing flicker within a certain range. The controller controls the potential difference between the electrodes based on the first information when the first mode is set and controls the potential difference between the electrodes based on the second information when the second mode is set.

8 Claims, 7 Drawing Sheets

LIQUID CRYSTAL DISPLAY PROJECTOR AND METHOD OF CONTROLLING THE SAME

BACKGROUND OF THE INVENTION

The present invention relates to a liquid crystal display apparatus such as a liquid crystal projector and a liquid crystal television.

The above-mentioned liquid crystal display apparatus uses a liquid crystal modulation element for converting light from a light source into images.

Some of the liquid crystal modulation elements are realized by putting nematic liquid crystal having positive dielectric anisotropy between a first transparent substrate having a transparent electrode (common electrode) formed thereon and a second transparent substrate having a transparent electrode (pixel electrode) forming pixels, wiring, switching elements and the like formed thereon. The liquid crystal modulation element is referred to as a Twisted Nematic (TN) liquid crystal modulation element in which the major axes of liquid crystal molecules are twisted by 90 degrees continuously between the two glass substrates. This liquid crystal modulation element is used as a transmissive liquid crystal modulation element.

Some of the liquid crystal modulation elements utilize a circuit substrate having reflecting mirrors, wiring, switching elements and the like formed thereon instead of the above-mentioned second transparent substrate. This is called a Vertical Arrangement Nematic (VAN) liquid crystal modulation element in which the major axes of liquid crystal molecules are oriented in homeotropic alignment substantially perpendicularly to two substrates. The liquid crystal modulation element is used as a reflective liquid crystal modulation element.

In these liquid crystal modulation elements, typically, Electrically Controlled Birefringence (ECB) effect is used to provide retardation for a light wave passing through a liquid crystal layer to control the change of polarization of the light wave, thereby forming an image from the light.

In the liquid crystal modulation element which utilizes the ECB effect to modulate the light intensity, application of an electric field to the liquid crystal layer moves ionic materials present in the liquid crystal layer. When a DC electric field is continuously applied to the liquid crystal layer, the ionic materials are pulled toward one of two opposite electrodes. Even when a constant voltage is applied to the electrodes, part of the electric field applied to the liquid crystal layer is cancelled out by the charged ions to substantially attenuate the electric field applied to the liquid crystal layer.

To avoid such a phenomenon, a line inversion drive method is typically employed in which the polarity of an applied electric field is reversed between positive and negative for each line of arranged pixels and is changed in a predetermined cycle such as 60 Hz or the like. In addition, a field inversion drive method is used in which the polarity of an applied electric field to all of arranged pixels is reversed between positive and negative in a predetermined cycle. Those drive methods can avoid the application of the electric field of only one polarity to the liquid crystal layer to prevent the unbalanced ions.

This corresponds to controlling the effective electric field applied to the liquid crystal layer such that it always has the same value as the voltage applied to the electrodes.

The variations of the effective electric field applied to the liquid crystal layer, however, are caused not only by the abovementioned movement of the ionic materials but also by other factors. One of the other factors causes trapping of charge of electrons or holes in a non-conductive film such as a liquid crystal alignment film made of an insulating material, a reflection enhancing film, and an inorganic passivation film for preventing dissolution of metal. The trapping causes charge-up on the interface of the film, and that electrostatic charge changes the effective electric filed applied to the liquid crystal layer with time.

The charging phenomenon may be seen due to the shape in the transmissive liquid crystal modulation element and occurs prominently in the reflective liquid crystal modulation element including opposite electrodes formed of different materials (mirror metal and indium tin oxide (ITO) film).

The probability of excitation of electrons or holes varies depending on the amounts of light energy and photon energy applied to the liquid crystal modulation element. In an irradiation time period from start of lighting of a lamp in a liquid crystal display apparatus (start of light irradiation), the charge in the interface layer of the liquid crystal is gradually accumulated to produce a potential difference between the opposite mirror electrode and ITO transparent electrode, which shifts the optimal potential difference between the opposite electrodes. As a result, as the light irradiation time elapses or the intensity of light irradiation is increased, flicker is more noticeable in a displayed image.

Japanese Patent Laid-Open No. 2002-365655 and Japanese Patent Laid-Open No. 2005-49817 have disclosed methods in which a potential difference between opposite electrodes is adjusted to the optimal level to minimize flicker. Particularly, in the method disclosed in Japanese Patent Laid-Open No. 2005-49817, a work-function adjusting film layer is formed on a reflecting pixel electrode to control the work function of the reflecting electrode to be ±2% or less relative to the work function of a transparent electrode (ITO film electrode) opposite thereto, thereby reducing charge-up on an interface layer of the liquid crystal to avoid occurrence of flicker or image sticking.

A typical liquid crystal display apparatus has a plurality of display modes, such as a standard mode, a cinema mode, and a contrast mode, in which a light source provides various levels of brightness, an optical filter is inserted into or removed from the optical path from the light source to the liquid crystal modulation element, an aperture stop is provided or not in the optical path from the light source, or the aperture stop provides various diameters of its aperture opening.

In the respective display modes, the amount of light energy applied to the liquid crystal modulation element is varied to change the amount of charge-up on the interface layer of the liquid crystal to change the potential difference between the opposite mirror electrode and ITO transparent electrode. In other words, the optimal potential difference between the opposite electrodes depends on the display mode. If the same potential difference is used as the optimal potential difference between the opposite electrodes regardless of the display mode, the occurrence of flicker cannot be prevented in some of the display modes.

If switching between the display modes produces a potential difference between the opposite mirror electrode and ITO transparent electrode, an additional problem occurs. Specifically, the constant DC electric field is continuously applied to the liquid crystal layer, so that ionic materials present in a small amount in the liquid crystal layer is pulled toward one of the opposite electrodes. The ionic material may be pulled toward the interfaces on both sides of the liquid crystal layer depending on the polarity of the charge of the ion.

Since the ions attached to the interface of the electrode are moved in accordance with the amplitude of a drive potential in the field inversion drive, the attachment state of the ions varies with the level of the amplitude of the drive potential. This results in variations of the effective electric field applied to the liquid crystal layer at different positions in a display area, which causes sticking. When the same image is displayed for a long time and then a different image is displayed, the previous image is seen as an afterimage. This is called the image sticking (or simply, sticking).

The control methods disclosed in Japanese Patent Laid-Open No. 2002-365655 and Japanese Patent Laid-Open No. 2005-49817, however, do not make control suitable for various display modes. Thus, switching between the display modes may lead to the inability to prevent flicker or the occurrence of the sticking.

BRIEF SUMMARY OF THE INVENTION

The present invention provides a liquid crystal display apparatus which can suppress occurrence of visible flicker and sticking regardless of display modes and can realize improved reliability for a long time, and a method of controlling the liquid crystal display apparatus.

The present invention in its first aspect provides a liquid crystal display apparatus including a liquid crystal modulation element which includes a liquid crystal layer between a first electrode and a second electrode and modulates light from a light source, a controller which controls a potential difference to be applied between the first and second electrodes such that the difference of a potential of the second electrode relative to a potential of the first electrode alternates periodically between positive and negative, and a memory which stores controlling information on the potential difference between the first and second electrodes for suppressing flicker within a certain range. The apparatus operates in a first mode and a second mode, the first and second modes being different in the amount of light entering the liquid crystal modulation element from the light source. The memory stores, as the controlling information, first information associated with the first mode and second information associated with the second mode. The controller controls the potential difference between the first and second electrodes based on the first information when the first mode is set and controls the potential difference between the first and second electrodes based on the second information when the second mode is set.

The present invention in its second aspect provides a method for controlling a liquid crystal display apparatus including a liquid crystal modulation element which includes a liquid crystal layer between a first electrode and a second electrode, the apparatus operating in a first mode and a second mode, the first and second modes being different in the amount of light entering the liquid crystal modulation element, and a potential difference to be applied between the first and second electrodes being controlled such that the difference of a potential of the second electrode relative to a potential of the first electrode alternates periodically between positive and negative. The method includes the steps of determining whether the first mode or the second mode is set, reading one of first information associated with the first mode and second information associated with the second mode from a memory according to the set mode, the first information and the second information being information on the potential difference between the first and second electrodes for suppressing flicker within a certain range, and controlling the potential difference between the first and second electrodes based on the information read from the memory.

Other objects and features of the present invention will be apparent from the following description of a preferred embodiment with reference to the accompanying drawings.

DETAILED DESCRIPTION OF THE PREFERRED EMBODIMENTS

A preferred embodiment of the present invention will hereinafter be described with reference to the drawings.

The premise technique of the present invention will be described prior to the description of the embodiment.

Figure 4:
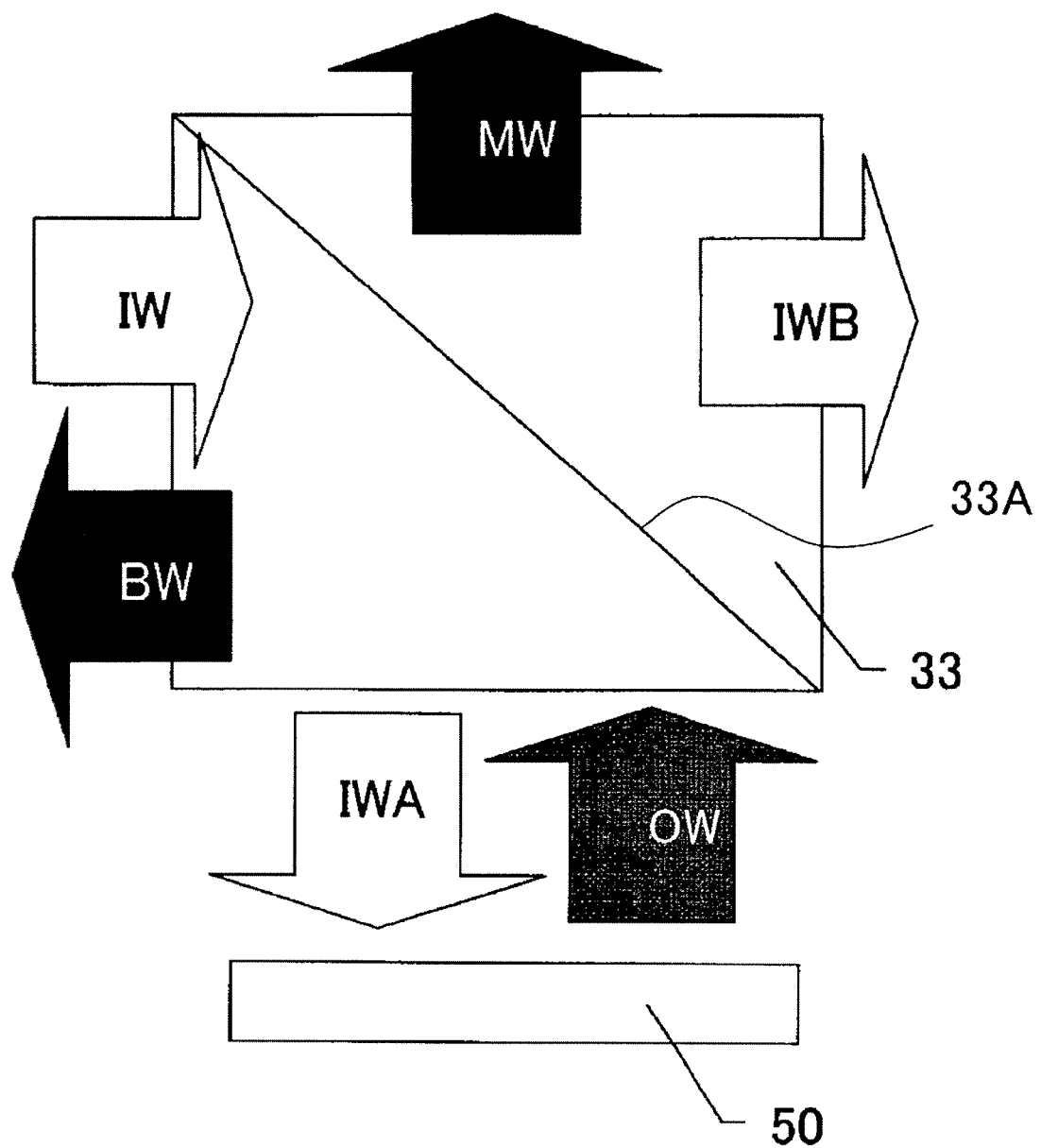
FIG. 4 is a block diagram showing the liquid crystal modulation element and a polarization beam splitter shown in FIG. 1.

FIG. 4 shows optical paths between a polarization beam splitter 33 and a reflective liquid crystal modulation element 50 in a liquid crystal display apparatus. As shown in FIG. 4, light from a light source indicated by the arrow IW enters the polarization beam splitter 33. Of the light entering the polarization beam splitter 33, a P-polarized light component is transmitted through a polarization beam splitting surface (polarization beam splitting film) 33A in the direction of the arrow IWB, while an S-polarized light component is reflected by the polarization beam splitting surface 33A in the direction of the arrow IWA. The S-polarized light component is lineally polarized light with a polarization direction perpendicular to the sheet of FIG. 4.

The pretilt angle of liquid crystal in the reflective liquid crystal modulation element 50 is inclined 45 degrees with respect to the polarization direction of the S-polarized light component. An electric field is applied to a liquid crystal layer of the reflective liquid crystal modulation element 50 such that the liquid crystal layer provides a retardation of one-half wavelength for the entering light. The light entering the reflective liquid crystal modulation element 50 is propagated through the liquid crystal layer in two specific modes. When the light is reflected and emerges from the reflective liquid crystal modulation element 50 in the direction of the arrow OW, the light has a phase difference $\delta(\lambda)$ represented by the following expression (1) between the two specific modes:

$$\delta(\lambda)=2\pi(2d\Delta n)/\lambda \quad (1)$$

where $\lambda$ represents the wavelength of the entering light, d the thickness of the liquid crystal layer, and $\Delta n$ the anisotropy of refractive index of the liquid crystal layer in a state in which a predetermined electric field is applied thereto.

Of the light emerging from the reflective liquid crystal modulation element 50 in the direction of the arrow OW, a light component with a polarization direction perpendicular to the sheet of FIG. 4 (an S-polarized light component with respect to the polarization beam splitter 33) is reflected by the polarization beam splitting surface 33A and returned toward the light source in the direction of the arrow BW. On the other hand, a light component with a polarization direction in parallel with the sheet of FIG. 4 (a P-polarized light component with respect to the polarization beam splitter 33) is transmitted through the polarization beam splitting surface 33A in the direction of the arrow MW.

The amount of the light, or the optical transfer rate $R(\lambda)$ of the light reflected by the reflective liquid crystal modulation element 50 and transmitted through the polarization beam splitter 33 in the direction of the arrow MW is expressed by the following expression (2):

$$R(\lambda) = 0.5 \{1 - \cos\delta(\lambda)\} \qquad (2)$$

where $\delta(\lambda)$ represents the abovementioned phase difference. The reflectance for S-polarized light, the transmittance for P-polarized light in the polarization beam splitter 33, the aperture ratio of the reflective liquid crystal modulation element 50, and the reflectance for non-polarized light are set to 100%.

Modulation of the electric field applied to the liquid crystal layer causes liquid crystal molecules to move from a tilt angle substantially perpendicular to substrates on both sides of the liquid crystal layer to a tilt angle substantially parallel to the substrates. As a result, the anisotropy of refractive index $\Delta n$ is apparently changed. The phase difference $\delta(\lambda)$ is changed from $\delta \approx 0$ to $\delta \approx 90$ degrees.

Next, description will be made of the basic structure of an energy band (energy potential) within the reflective liquid crystal modulation element with reference to FIG. 5. In the reflective liquid crystal modulation element, an electric filed is applied to the liquid crystal layer through an ITO transparent electrode disposed on the entrance and emergence side of light and a metallic mirror electrode serving as an electrode and a mirror surface. The metallic mirror electrode is primarily made of aluminum or an alloy of aluminum.

Figure 5:
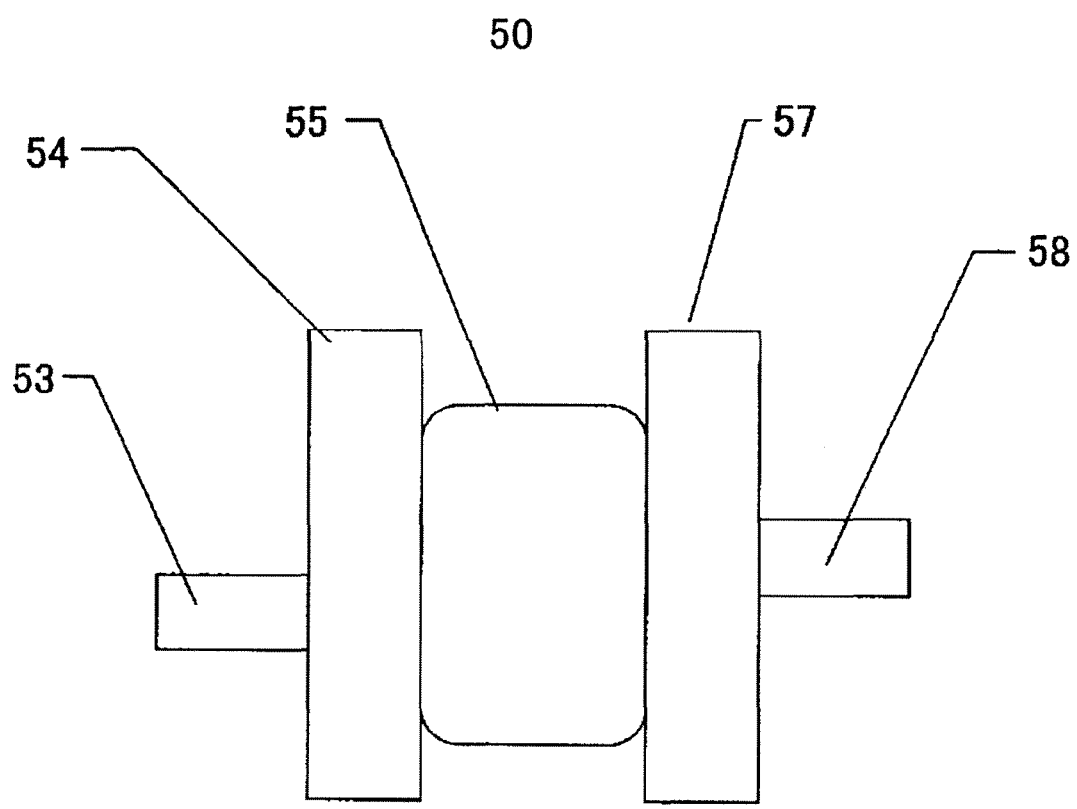
FIG. 5 is a section view showing the basic structure of the liquid crystal modulation element common to the embodiment and the related art.

In FIG. 5, reference numeral 53 shows the ITO transparent electrode, and 58 the metallic mirror electrode made of aluminum. Reference numeral 55 shows the liquid crystal layer, and 54 and 57 obliquely-evaporated porous liquid crystal alignment films for providing VAN liquid crystal alignment. The liquid crystal alignment films 54 and 57 are made of inorganic non-conductive material predominantly composed of silicon oxide.

The liquid crystal layer 55 is sandwiched between the liquid crystal alignment films 54 and 57. The reflective liquid crystal modulation element has the basic structure in which the ITO transparent electrode 53 and the metallic mirror electrode 58 are in contact with the outside thereof. The vertical direction in FIG. 5 represents the level of the energy potential, and the vacuum level is present in the upper position.

Since the work function energy of the ITO transparent electrode 53 from the vacuum level is approximately 5.0 eV and that of the aluminum metallic mirror electrode 58 is approximately 4.2 eV, they have an energy potential difference of approximately 0.8 eV in their materials.

The Fermi levels of the liquid crystal layer 55 that is a non-conductive insulator and the liquid crystal alignment films 54 and 57 made of silicon oxide are locked to be equal to the energy potential level of aluminum which has substantially equal electron mobility and hole mobility.

It is difficult to directly measure the widths of the energy bands of the liquid crystal alignment films 54 and 57 made of porous silicon oxide. The width of the energy band of silicon oxide ranges from approximately 6 to 9 eV depending on the property of the film. Approximately 6 eV is assumed herein in view of the porous structure.

Thus, between the mirror electrode 58 made of aluminum, the liquid crystal layer 55, and the liquid crystal alignment film 57, the energy for excitation trapping of electrons is assumed as approximately 3 eV and the energy for excitation trapping of holes is also assumed as approximately 3 eV.

In contrast, between the ITO transparent electrode 53, the liquid crystal layer 55, and the liquid crystal alignment film 54, the energy for excitation trapping of electrons is assumed as approximately 3.8 eV, while the energy for excitation trapping of holes is assumed as approximately 2.2 eV.

As described above, the energy band of the reflective liquid crystal modulation element has the basic structure as shown in FIG. 5. However, this energy band structure has unbalanced excitation charge-up of electrons and holes. Therefore, a DC electric field between the opposite alignment films on both sides of the liquid crystal layer is drastically increased due to the charge-up with increase of use time of the liquid crystal modulation element.

Figure 6:
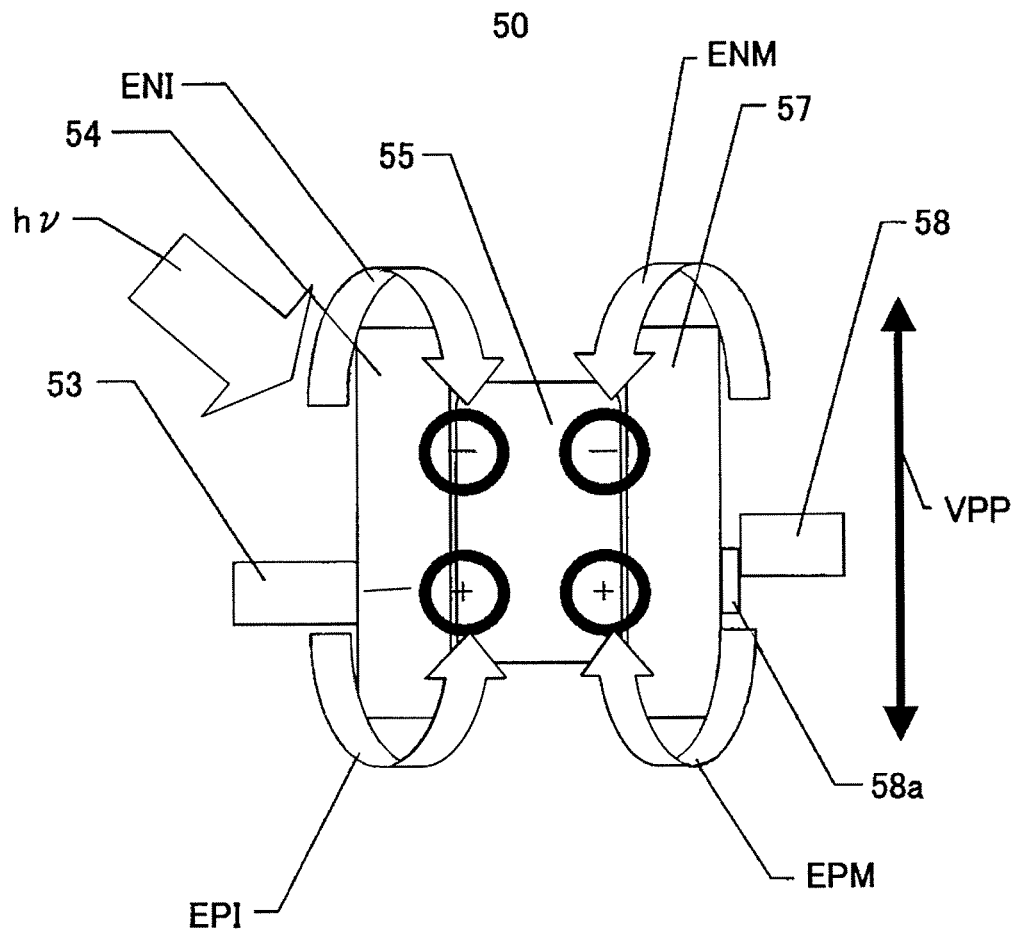
FIG. 6 is a schematic diagram for explaining a charge-up phenomenon on a liquid crystal interface layer in a conventional liquid crystal modulation element.

Japanese Patent Laid-Open No. 2005-49817 described above has disclosed a method shown in FIG. 6 to overcome the problem. FIG. 6 shows a work-function adjusting film 58a made of nickel, rhodium, lead, platinum, or an oxide thereof having a work function larger than that of aluminum between the metallic mirror electrode 58 made of aluminum and the liquid crystal alignment film 57. This brings the work function of the metallic mirror electrode 58 close to the work function of the ITO transparent electrode 53.

In FIG. 6, ENI and ENM show excitation of electrons. EPI and EPM show excitation of holes. ENI and EPI show excitation from the ITO transparent electrode (53) side. ENM and EPM show excitation from the metallic mirror electrode (58) side.

According to the structure in FIG. 6, the electrons and holes are excited from the electrodes 53 and 58 at excitation probabilities which are not the same but very similar to each other. For this reason, charge-up amounts with electrons and holes trapped in the liquid crystal layer 55 and liquid crystal alignment films 54 and 57 are not the same but similar to each other on both side of the electrodes. Therefore, the charges of the electrons and holes trapped in the liquid crystal layer 55 and liquid crystal alignment films 54 and 57 can significantly reduce the intensity of an electric field generated between the ITO transparent electrode 53 and the metallic mirror electrode 58.

It is contemplated that the improved structure of the liquid crystal modulation element as described above may reduce flicker or sticking in the early stages of use of the liquid crystal modulation element.

However, during operation of the liquid crystal modulation element, an electric field applied to the liquid crystal layer indicated by the arrow VPP in FIG. 6 is applied by the field inversion drive method. Accordingly, the relative relationship of the energy potentials (energy levels or work functions) between both the electrodes and the liquid crystal layer is distorted. In addition, the excitation probability of electrons or holes varies with the amounts of the light energy and the photon energy indicated by the arrow hv in FIG. 6.

As described above, since the relationship of the energy potentials is distorted and the excitation probability of electrons or holes varies with the amount of light entering the liquid crystal modulation element, a minimum flicker interelectrode potential difference, which is the optimal potential difference between the ITO transparent electrode 53 and the metallic mirror electrode 58 (potential difference between opposite electrodes) for suppressing or minimizing the flicker, depends on the display mode (that is, the amount of light entering the liquid crystal modulation element) of the liquid crystal display apparatus. Therefore, even the minimum flicker interelectrode potential difference which can suppress the flicker in a certain display mode may not suppress the flicker in another display mode.

The display modes of the liquid crystal display apparatus herein include a standard mode, a cinema mode, a contrast mode, and the like. These display modes are modes in which a light source provides different levels of brightness, an optical filter is inserted into or removed from the optical path from the light source to the liquid crystal modulation element, an aperture stop is provided or not in the optical path from the light source to the liquid crystal modulation element, or the aperture stop provides various diameters of its aperture opening.

To address this, in the present invention, information on the minimum flicker interelectrode potential difference for each display mode (that is, first information and second information) is previously stored in a memory, and if switching is made between the modes, the potential difference between opposite electrodes is also changed based on the information associated with the set mode. This allows suppression of the flicker in each of the modes.

The 'flicker' used in this embodiment includes variations of light amount (flicker) which are not sensed by (invisible to) human eyes. Furthermore, 'suppressing the flicker' in this embodiment means reducing the flicker as variations of light amount occurring in the liquid crystal display apparatus within a certain range in which the flicker is invisible (or hardly visible). In other words, 'suppressing the flicker' in this embodiment is not limited to complete elimination of the flicker.

Specifically, in a case where the same image signal is continuously input to the liquid crystal display apparatus, it is preferable that the difference between the absolute values of the positive and negative voltages of the voltage (effective voltage) applied to the liquid crystal layer is equal to or smaller than 400 mV (more preferably, equal to or smaller than 300 mV, still more preferably, equal to or smaller than 200 mV). In other words, it is preferable that the difference of the potential actually applied to the ITO transparent electrode from the potential of the ITO transparent electrode which can minimize the flicker is equal to or lower than 200 mV (preferably, equal to or lower than 150 mV, still more preferably, equal to or lower than 100 mV) The same off course can be applied to the potential of the mirror electrode (pixel electrode).

It should be noted that liquid crystal modulation elements generally have a characteristic in which, in every use thereof, the minimum flicker interelectrode potential difference reduces until a time T1 after a lapse of about 30 minutes from the start of use (start of light modulation operation) and becomes a certain steady-state value after the time T1. This is caused due to various extra factors such as the intensity of light entering the liquid crystal modulation element. At the early stages of time of use of the liquid crystal modulation element, for example at the first use, the steady-state minimum flicker interelectrode potential difference is 0V.

For example, when the liquid crystal modulation element is illuminated with high intensity light of about 3 mW/cm$^2$, the minimum flicker interelectrode potential difference may change with time by about 20 mV in about 30 minutes. Considering such a case, the minimum flicker interelectrode potential difference in this embodiment is defined as a steady-state potential difference which does not change in a short time of about a few minutes.

Specifically, the steady state means a state in which, when the minimum flicker interelectrode potential differences are continuously measured in 2 minutes, the difference of the average values of the minimum flicker interelectrode potential differences measured in the first 1 minute and the next 1 minute becomes equal to or smaller than 10 mV.

For general liquid crystal modulation elements, the value of 10 mV is a sufficient value as the steady-state value. However, this value may be 30 mV if considering a liquid crystal modulation element having singular characteristics.

The steady-state minimum flicker interelectrode potential difference generally changes with increase of time of use of the liquid crystal modulation element. Thus, the minimum flicker interelectrode potential difference according to the time of use may be stored in the memory for each display mode.

Figure 1:
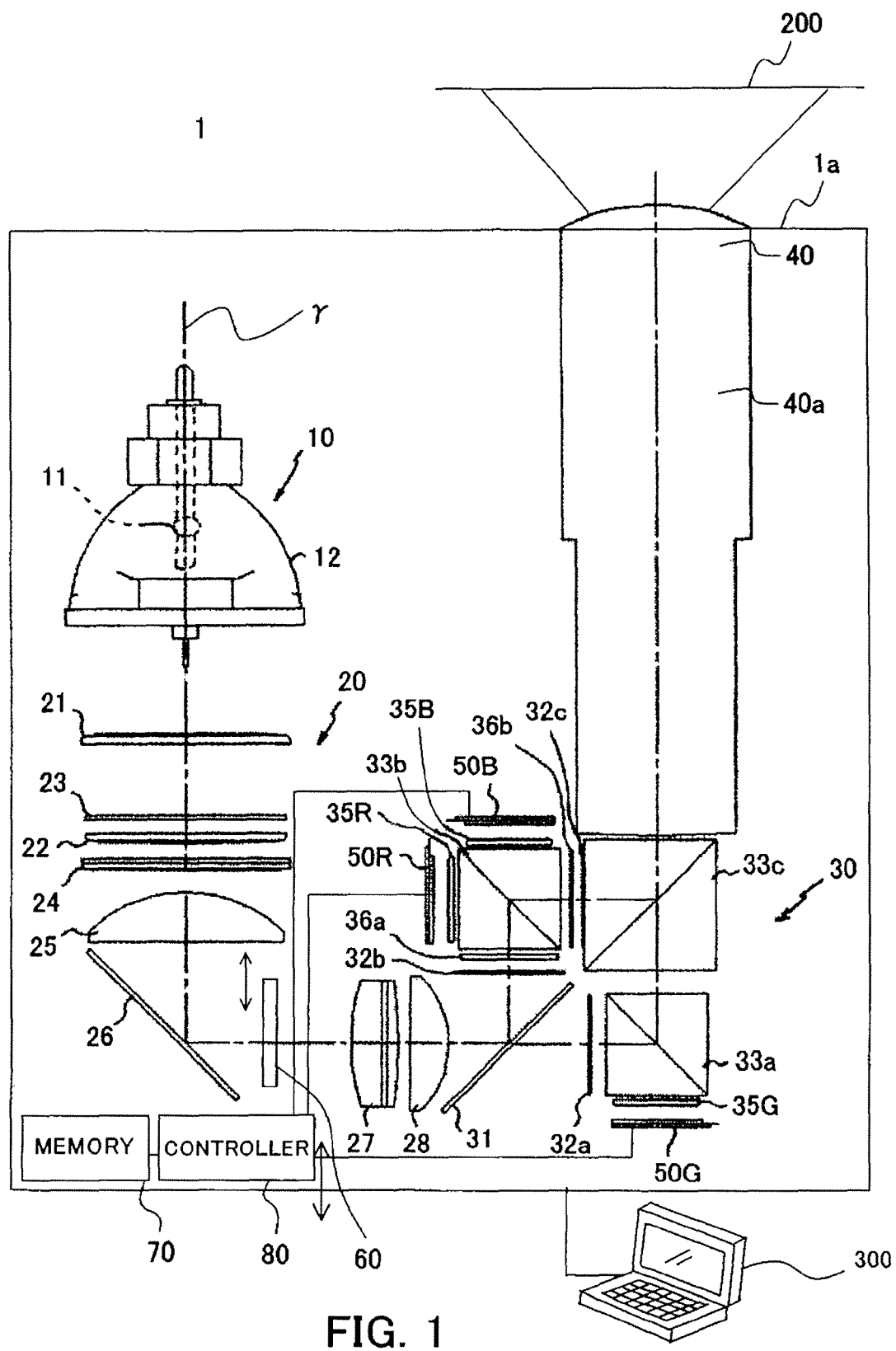
FIG. 1 is a plan view showing the configuration of a liquid crystal display apparatus which is an embodiment of the present invention.

FIG. 1 shows the configuration of a liquid crystal display apparatus 1 which is an embodiment of the present invention. The liquid crystal display apparatus 1 of the embodiment is a liquid crystal projector which includes reflective liquid crystal modulation elements (reflective liquid crystal panels) and projects images on a screen 200.

While the embodiment is described in conjunction with the liquid crystal projector, the present invention is applicable to a liquid crystal display apparatus of a different type such as a liquid crystal television.

The liquid crystal display apparatus 1 includes a housing 1a, a lamp 10, an illumination optical system 20, a color separation/combination optical system 30, a projection lens 40, reflective liquid crystal modulation elements 50R, 50G, and 50B, an optical filter 60, a memory 70, and a controller 80.

The housing 1a contains the following component constituting the liquid crystal display apparatus 1. Part of the projection lens 40 protrudes from part of the housing 1a. Alternatively, the entire projection lens 40 may be contained in the housing 1a. The housing 1a includes an adjusting mechanism for adjusting the inclination of the liquid crystal display apparatus 1.

The lamp 10 includes an arc tube 11 and a reflector 12. In response to power from a power supply, not shown, electrical discharge occurs in the arc tube 11 which then emits white light with a continuous spectrum.

The reflector 12 collects the light from the arc tube 11 in a predetermined direction. The reflector 12 is formed of a mirror or the like with high reflectivity and has a parabolic shape or a spherical shape. In FIG. 1, γ represents the optical axis of the entire optical system from the lamp 10 to the projection lens 40.

The illumination optical system 20 transmits the light from the lamp 10 to the color separation/combination optical system 30. The illumination optical system 20 includes cylinder arrays 21 and 22, an ultraviolet absorbing filter 23, a polarization conversion element 24, a front compressor 25, a total reflection mirror 26, a condenser lens 27, and a rear compressor 28.

The cylinder array 21 is formed of a plurality of lens cells having a refractive power only in a vertical direction perpendicular to the optical axis γ and to the sheet of FIG. 1, and divides the light from the lamp 10 into a plurality of luminous fluxes. The cylinder array 22 includes a plurality of lens cells associated with the lens cells of the cylinder array 21, and causes each of the plurality of luminous fluxes to form a secondary image of the light source at a position close to the polarization conversion element 24.

The ultraviolet absorbing filter 23 absorbs an ultraviolet component of the light from the lamp 10. The ultraviolet absorbing filter 23 is disposed between the cylinder array 21 and the cylinder array 22.

The polarization conversion element 24 converts the non-polarized light from the lamp 10 into linearly polarized light with a predetermined polarization direction.

The front compressor 25 is formed of a cylindrical lens having a refractive power only in a horizontal direction, which is perpendicular to the optical axis γ and in parallel with the sheet of FIG. 1.

The total reflection mirror 26 reflects the light from the lamp 10 (front compressor 25) to bend the optical axis of the optical system by 90 degrees.

The condenser lens 27 collects the plurality of luminous fluxes divided by the cylinder arrays 21 and 22. The rear compressor 28 is formed of a cylindrical lens having a refractive power only in the horizontal direction. The optical effects of the front compressor 25, the condenser lens 27, and the rear compressor 28 causes the plurality of luminous fluxes to overlap one another and form a uniform rectangular illumination area. The display surfaces of the reflective liquid crystal modulation elements 50R, 50G, and 50B, later described, are placed in the illumination area.

The color separation/combination optical system 30 separates the white color from the lamp 10 into components of blue (B), red (R), and green (G), directs the components to the three liquid crystal modulation elements 50R, 50G, and 50B, and combines blue light, red light, and green light from the three liquid crystal modulation elements. The color separation/combination optical system 30 includes a dichroic mirror 31, polarizing plates 32a, 32b, and 32c, polarization beam splitters 33a, 33b, and 33c, quarter-phase plates 35R, 35G, and 35B, and color-selective phase plates 36a, 36b.

The dichroic mirror 31 reflects blue light and red light and transmits green light.

Each of the polarizing plates 32a, 32b, and 32c is formed by bonding a polarization element to a transparent substrate and transmits only S-polarized light. The polarizing plate 32a is an entrance-side polarizing plate disposed in front of the polarization beam splitter 33a in the optical path for green light. The polarizing plate 32b is an entrance-side polarizing plate disposed in front of the polarization beam splitter 33b in the optical path for red light and blue light. The polarizing plate 32c is an emergence-side polarizing plate disposed between the polarization beam splitters 33b and 33c in the optical path for red light and blue light.

The color-selective phase plate 36a rotates the polarization direction of blue light emerging from the polarizing plate 32b by 90 degrees and does not change the polarization direction of red light.

Each of the polarization beam splitters 33a, 33b, and 33c has a polarization beam splitting surface which transmits P-polarized light and reflects S-polarized light. The polarization beam splitter 33a reflects S-polarized green light emerging from the polarizing plate 32a. The polarization beam splitter 33b transmits P-polarized blue light and reflects S-polarized red light emerging from the color-selective phase plate 36a.

The quarter-phase plates 35R, 35G, and 35B correct disturbance of the linearly polarized light components emerging from the polarization beam splitters 33a, 33b, and 33c and direct the polarized light components to the liquid crystal modulation elements 50R, 50G, and 50B, respectively.

The liquid crystal display apparatus 1 of the embodiment receives image information (image signal) supplied from an image supply apparatus 300 such as a personal computer, a DVD player, and a television tuner. The liquid crystal display apparatus 1 and the image supply apparatus 300 constitute an image display system. The controller 80 drives the reflective liquid crystal modulation elements 50R, 50G, and 50B in response to the image information input thereto. This causes the light entering the liquid crystal modulation elements 50R, 50G, and 50B to be image-modulated and reflected.

The red light, green light, and blue light reflected by the liquid crystal modulation elements 50R, 50G, and 50B enter the polarization beam splitters 33a, 33b via the quarter-phase plates 35R, 35G, and 35B, respectively.

The P-polarized green light is transmitted through the polarization beam splitter 33a, enters and is transmitted through the polarization beam splitter 33c, and is directed toward the projection lens 40. The P-polarized red light transmitted through the polarization beam splitter 33b and the S-polarized blue light reflected by the polarization beam splitter 33b enter the color-selective phase plate 36b.

The color-selective phase plate 36b rotates the polarization direction of the red light by 90 degrees and does not change the polarization direction of the blue light. Thus, the S-polarized red light and S-polarized blue light enter the polarization beam splitter 33c, are reflected by the polarization beam splitter 33c, and directed toward the projection lens 40.

The projection lens 40 projects the light color-combined by the polarization beam splitter 33c toward the screen 200. The projection lens 40 is formed of a plurality of lenses, not shown, contained in a barrel 40a.

The optical filter 60 blocks a light component in a specific wavelength band of the light from the lamp 10. In the embodiment, the optical filter 60 is placed on the optical path between the lamp 10 and the color separation/combination optical system 30. The optical filter 60 can be inserted into and removed from the optical path by a moving mechanism, not shown.

Figure 2:
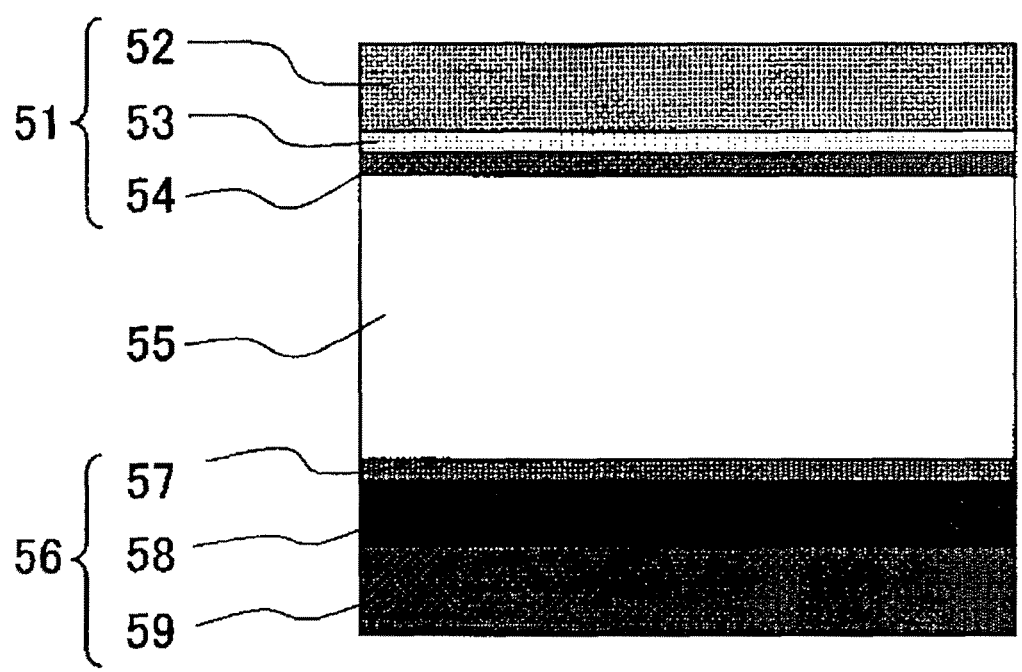
FIG. 2 is a section view showing the structure of a liquid crystal modulation element shown in FIG. 1.

FIG. 2 shows the structure of the reflective liquid crystal modulation elements 50R, 50G, and 50B. In the following description, reference numeral 50 is used for the reflective liquid crystal modulation element.

The liquid crystal modulation element 50 includes a transparent substrate 51, a liquid crystal layer 55, and a drive substrate 56. The transparent substrate 51 is placed across the liquid crystal layer 55 from the drive substrate 56. The transparent substrate 51 includes a glass substrate 52, a transparent electrode 53, and an alignment film 54.

The glass substrate 52 transmits entering light and holds the transparent electrode 53. The transparent electrode 53 is made of indium tin oxide (ITO) which is an oxide of indium and tin, and is formed as a thin film on the surface of the glass substrate 52.

The alignment film 54 has the function of orientating liquid crystal molecules. The alignment film 54 is a thin film coating the surface of the transparent electrode 53 and formed as an obliquely-evaporated porous liquid crystal alignment film predominantly composed of silicon oxide for achieving VAN liquid crystal alignment.

The nematic liquid crystal is used for the liquid crystal layer 55 in the embodiment. The nematic liquid crystal includes molecules which are oriented in substantially the same direction while other regular arrangement is hardly found.

The liquid crystal layer 55 is placed between the alignment film 54 and an alignment film 57, later described.

The drive substrate 56 includes the alignment film 57, a pixel electrode 58, and a silicon (Si) substrate 59. The alignment film 57 is a thin film coating the surface of the pixel electrode 58 and is an obliquely-evaporated porous liquid crystal alignment film predominantly composed of silicon oxide for achieving VAN liquid crystal alignment.

The pixel electrode 58 is formed on the Si substrate 59 and has the function of applying an electric field to the liquid crystal layer 55 together with the transparent electrode 53. The pixel electrode 58 is constituted by a plurality of metallic mirror electrodes made of aluminum or an alloy of aluminum, the metallic mirror electrodes serving as mirror surfaces.

In FIG. 1, the controller 80 is formed of a CPU or a microcomputer and applies a predetermined DC voltage to the transparent electrode 53. The controller 80 applies an AC voltage to the pixel electrode 58 in accordance with the image information supplied from the image supply apparatus 300.

Thereby, an AC voltage with a rectangular wave shape alternately having a positive potential difference and a negative potential difference in a predetermined cycle relative to the voltage at the transparent electrode 53 is applied to the pixel electrode 55.

The voltage applied to each of the electrodes or the liquid crystal layer in the embodiment means a potential relative to ground (zero volts), not shown, that is, a potential difference from the ground. The transparent electrode 53 and the pixel electrode 58 correspond to a first electrode and a second electrode, respectively.

The memory 70 previously stores minimum flicker potential difference information (controlling information) representing the optimal potential difference (that is, the minimum flicker interelectrode potential difference) applied between the transparent electrode 53 and the pixel electrode 58 to suppress or minimize the flicker.

The liquid crystal display apparatus 1 of the embodiment has a plurality of display modes such as a presentation mode, a cinema mode, and a color-emphasis mode. A user can operate a mode select switch, not shown, to select and set one of the plurality of display modes. Arbitrary two of the plurality of display modes correspond to a first mode and a second mode. It should be noted that having the first and second modes does not mean having only two modes but having at least two modes.

In the presentation mode, the output (light amount) of the lamp 10 is set to the maximum, and the optical filter 60 is not inserted into the optical path. The intensity of light entering the liquid crystal modulation element 50 is at the highest of those in the plurality of display modes.

In the cinema mode, the light amount from the lamp 10 is set to a lower level than that in the presentation mode. The intensity of light entering the liquid crystal modulation element 50 is lower than that in the presentation mode. The optical filter 60 is not inserted into the optical path.

In the color-emphasis mode, the light amount from the lamp 10 is equal to that in the cinema mode, but the optical filter 60 is inserted into the optical path. Thus, the intensity of light entering the liquid crystal modulation element 50 is at the lowest of those in the plurality of display modes.

In this manner, the intensity of light entering the liquid crystal modulation element 50 depends on the display mode.

The amount of light energy applied to the liquid crystal modulation element 50 varies with the display modes to change the charge-up amount on the interface layer of the liquid crystal to produce various potential differences between the opposite pixel electrode 58 and ITO transparent electrode 53.

Figure 3:
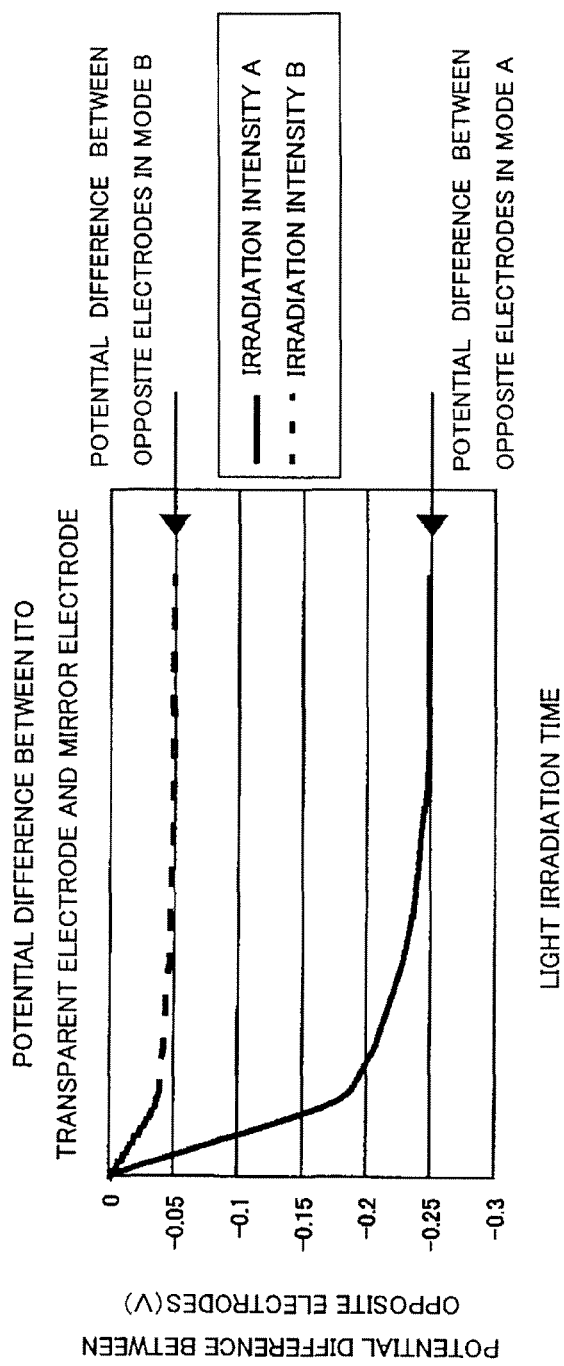
FIG. 3 is a graph showing minimum flicker interelectrode potential differences in the liquid crystal modulation element for each of modes in the liquid crystal display apparatus in FIG. 1.

FIG. 3 shows the minimum flicker interelectrode potential difference (shown as 'potential difference between opposite electrodes' in FIG. 3) which changes with time from the start of lighting of the lamp 10 (start of light irradiation) when the brightness of the lamp 10 is changed, that is, when switching is made between the display modes.

In a mode A (first mode) and a mode B (second mode), the intensities of light applied to the liquid crystal modulation element 50 are represented as an irradiation intensity A and an irradiation intensity B. The irradiation intensity A is higher than the irradiation intensity B.

When light with the irradiation intensity A higher than the irradiation intensity B is applied to the liquid crystal modulation element 50, the shift amount of the minimum flicker interelectrode potential difference (potential in a saturated portion in the figure) is larger than when light with the irradiation intensity B is applied thereto.

In the embodiment, first minimum flicker potential difference information and second minimum flicker potential difference information which represent the optimal potential differences between the opposite electrodes in the modes A and B, respectively, are stored in the memory 70. When the mode A is set, the controller 80 reads out the first minimum flicker potential difference information from the memory 70 and provides the potential difference in accordance with the read information for the transparent electrode 53 and the pixel electrode 58. When the mode B is set, the controller 80 reads the second minimum flicker potential difference information from the memory 70 and provides the potential in accordance with the read information for the transparent electrode 53 and the pixel electrode 58.

Thus, even when switching is made between the display modes, the occurrence of flicker and sticking can be prevented favorably to increase the quality of the liquid crystal display apparatus 1 and improve long-term reliability.

Figure 7:
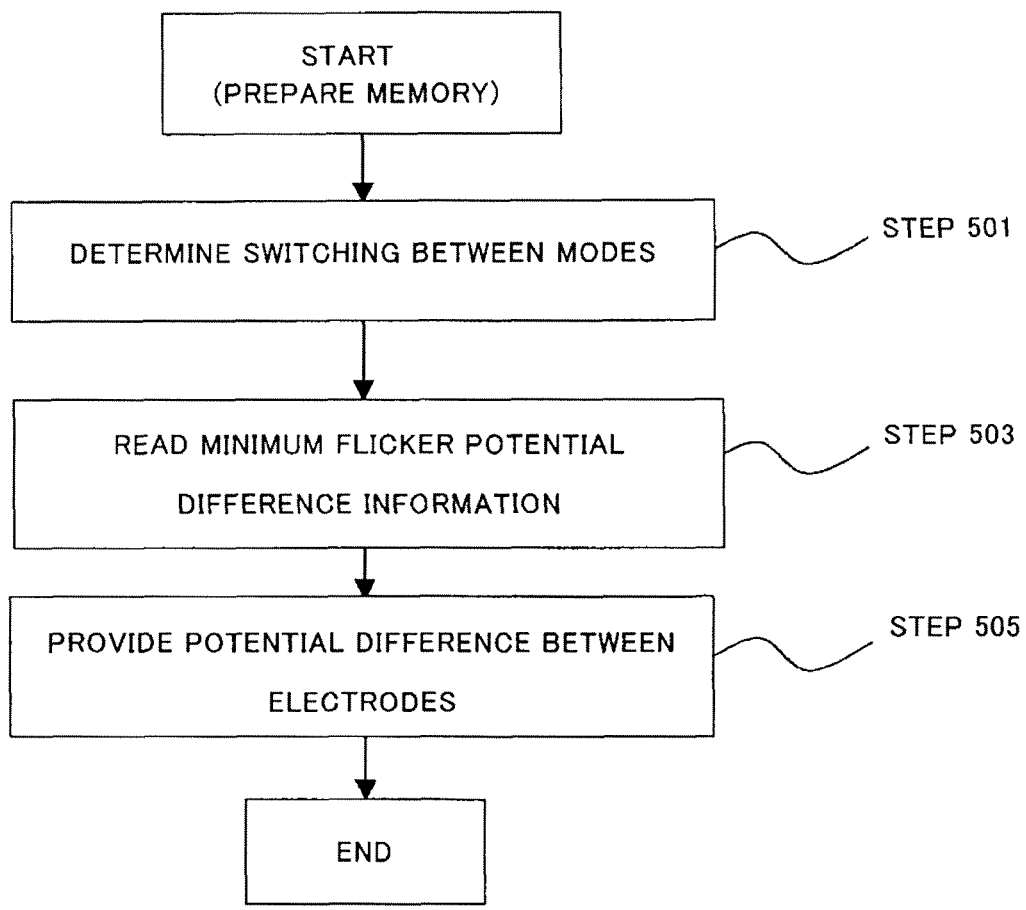
FIG. 7 is a flow chart showing the details of a control program for the liquid crystal display apparatus in the embodiment.

The operation of the controller 80 (control method) in the liquid crystal display apparatus 1 in the embodiment will be described with reference to FIG. 7. The operation is performed in accordance with a computer program stored in the controller 80.

When the power of the liquid crystal display apparatus 1 is turned on, the controller 80 first determines whether or not switching is made between the display modes (step 501). The controller 80 checks the set mode.

The controller 80 reads out from the memory 70 the minimum flicker potential difference information associated with the set mode (step 503).

The controller 80 makes control to apply the potential difference corresponding to the read minimum flicker potential difference information between the transparent electrode 53 and the pixel electrode 58 (step 505).

The embodiment has been described in conjunction with the minimum flicker potential difference information representing the optimal potential difference between opposite electrodes for each of the modes stored in the memory 70. It is also possible to store information on an expression for calculating the optimal potential difference between opposite electrodes for each of the modes as the minimum flicker potential difference information. In this case, the controller 80 reads the information of the expression in association with the mode from the memory 70 to calculate the optimal potential difference between the opposite electrodes and provides the calculated potential difference between the transparent electrode 53 and the pixel electrode 58.

Furthermore, the present invention is not limited to these preferred embodiments and various variations and modifications may be made without departing from the scope of the present invention.

This application claims foreign priority benefits based on Japanese Patent Applications Nos. 2006-001891, filed on Jan. 6, 2006, and 2006-344835, filed on Dec. 21, 2006 and each of which is hereby incorporated by reference herein in its entirety as if fully set forth herein.

What is claimed is:

1. A liquid crystal display projector comprising:
a lamp;
a power supply which supplies power to the lamp and lights the lamp;
a reflective liquid crystal modulation element which includes a liquid crystal layer between a transparent electrode and a reflective electrode and modulates light from the lamp;
an illumination optical system which directs light from the lamp to the reflective liquid crystal modulation element;
a controller which controls a DC voltage applied to the transparent electrode and an AC voltage applied to the reflective electrode such that the difference of a potential of the reflective electrode relative to a potential of the transparent electrode alternates periodically between positive and negative; and
a memory which stores controlling information on the DC voltage applied to the transparent electrode for suppressing flicker within a certain range,
wherein the liquid crystal display projector operates in a first mode and a second mode, the amount of light entering from the illumination optical system to the liquid crystal display modulation element being larger in the first mode than in the second mode,
the reflective liquid crystal modulation element modulates and reflects light from the illumination optical system in both the first mode and the second mode,
the memory has first information associated with the first mode and second information, which is different from the first information, associated with the second mode stored therein as the controlling information,
the controller controls the DC voltage applied to the transparent electrode based on the first information when the first mode is set and controls the DC voltage applied to the transparent electrode based on the second information when the second mode is set,
a shift amount of the DC voltage applied to the transparent electrode until an elapse of a predetermined time from a start of light irradiation in the first mode is larger than that in the second mode,
the DC voltage applied to the transparent electrode is larger in the first mode than in the second mode, and
the power supply lights the lamp in the first mode and the second mode.

2. The liquid crystal display projector according to claim 1, wherein the transparent electrode transmits light from the lamp, and the reflective electrode, which includes a plurality of pixel electrodes, reflects light from the lamp.

3. A method for controlling a liquid crystal display projector comprising a lamp; a power supply which supplies power to the lamp and lights the lamp; a reflective liquid crystal modulation element including a liquid crystal layer between a transparent electrode and a reflective electrode; and an illumination optical system which directs light from the lamp to the reflective liquid crystal modulation element, the reflective liquid crystal modulation element modulating and reflecting light from the illumination optical system in both a first mode and a second mode, the power supply lighting the lamp in the first mode and the second mode, the liquid crystal display projector operating in the first mode and the second mode, the amount of light entering from the illumination optical system to the liquid crystal display modulation element being larger in the first mode than in the second mode, and a DC voltage applied to the transparent electrode and an AC voltage to the reflective electrode such that the difference of a potential of the reflective electrode relative to a potential of the transparent electrode alternates periodically between positive and negative, the method comprising the steps of:
determining whether the first mode or the second mode is set;
reading one of first information associated with the first mode and second information, which is different from the first information, associated with the second mode from a memory according to the set mode, the first information and the second information being information on the DC voltage applied to the transparent electrode for suppressing flicker within a certain range; and
controlling the DC voltage applied to the transparent electrode based on the information read from the memory,
wherein the DC voltage applied to the transparent electrode is larger in the first mode than in the second mode.

4. The liquid crystal display projector according to claim 1, further comprising a selector which selects one of a plurality of display modes where the amount of light emitted from the lamp is different from each other, the plurality of display modes including the first mode and the second mode.

5. The liquid crystal display projector according to claim 1, wherein an optical filter is not inserted between the lamp and the liquid crystal modulation element in the first mode, but is inserted between the lamp and the liquid crystal modulation element in the second mode.

6. The liquid crystal display projector according to claim 1, wherein an aperture stop is not provided between the lamp and the liquid crystal modulation element in the first mode, but is provided between the lamp and the liquid crystal modulation element in the second mode.

7. The liquid crystal display projector according to claim 1, wherein an aperture stop is provided between the lamp and the liquid crystal modulation element, and a diameter of an opening of the aperture stop in the first mode is larger than that in the second mode.

8. A liquid crystal display projector comprising:
a reflective liquid crystal modulation element which includes a liquid crystal layer between a transparent electrode and a reflective electrode and modulates light from the lamp;
an illumination optical system which directs light from the lamp to the reflective liquid crystal modulation element;
a controller which controls a DC voltage applied to the transparent electrode and an AC voltage applied to the reflective electrode such that the difference of a potential of the reflective electrode relative to a potential of the transparent electrode alternates periodically between positive and negative; and
a memory which stores controlling information on the DC voltage applied to the transparent electrode for suppressing flicker within a certain range,
wherein the liquid crystal display projector operates in a first mode and a second mode, the amount of light entering from the illumination optical system to the liquid crystal display modulation element being larger in the first mode than in the second mode, the reflective liquid crystal modulation element modulates and reflects light from the illumination optical system in both the first mode and the second mode, the memory has first information associated with the first mode and second information, which is different from the first information, associated with the second mode stored therein as the controlling information, the controller controls the DC voltage applied to the transparent electrode based on the first information when the first mode is set and controls the DC voltage applied to the transparent electrode based on the second information when the second mode is set, and the DC voltage applied to the transparent electrode is larger in the first mode than in the second mode.

* * * * *